US012373533B2

United States Patent
Puri et al.

(10) Patent No.: US 12,373,533 B2
(45) Date of Patent: Jul. 29, 2025

(54) METHOD AND SYSTEM FOR DIGITAL IDENTITY AND TRANSACTION VERIFICATION

(71) Applicant: GCOM Software LLC, Columbia, MD (US)

(72) Inventors: Rahul Puri, Saint Joseph, MO (US); Andrew Ferreira, Holmdel, NJ (US); Ivan Jackson, Midlothian, VA (US); Piyush Bhatnagar, Morganville, NJ (US)

(73) Assignee: GCOM Software LLC

( * ) Notice: Subject to any disclaimer, the term of this patent is extended or adjusted under 35 U.S.C. 154(b) by 125 days.

(21) Appl. No.: 18/151,498

(22) Filed: Jan. 9, 2023

(65) Prior Publication Data

US 2023/0224309 A1 Jul. 13, 2023

Related U.S. Application Data (60) Provisional application No. 63/266,560, filed on Jan. 7, 2022.

(51) Int. Cl.
| | |
|---|---|
| *G06F 21/33* | (2013.01) |
| *G06Q 20/38* | (2012.01) |
| *G06Q 50/26* | (2012.01) |
| *H04L 9/40* | (2022.01) |

(52) U.S. Cl.
CPC ....... *G06F 21/33* (2013.01); *G06Q 20/38215* (2013.01); *G06Q 50/265* (2013.01); *H04L 63/123* (2013.01)

(58) Field of Classification Search
CPC ... G06F 21/33; G06Q 10/06; G11B 20/00086; H04L 63/08; H04L 63/126; H04L 9/3236; H04L 9/3247
See application file for complete search history.

(56) References Cited

U.S. PATENT DOCUMENTS

| | | | |
|---|---|---|---|
| 11,139,976 | B2 | 10/2021 | Khan |
| 11,233,637 | B2 | 1/2022 | Dolev et al. |
| 11,379,838 | B2 | 7/2022 | Shum et al. |
| 11,425,111 | B2 | 8/2022 | Smith et al. |
| 2017/0180128 | A1 | 6/2017 | Lu |
| 2019/0207951 | A1* | 7/2019 | Oberhauser ...... G06Q 20/38215 |
| 2020/0153639 | A1 | 5/2020 | Yang et al. |

(Continued)

OTHER PUBLICATIONS

International Search Report and Written Opinion for PCT/US2023/060252 dated Mar. 26, 2023, 14 pages.

*Primary Examiner* — Kyung H Shin
(74) *Attorney, Agent, or Firm* — Fox Rothschild LLP (57) ABSTRACT

Methods of determining whether to trust an entity before sharing information with the entity, as well as methods of verifying whether to trust information received from an entity, are disclosed. In the processes, two entities, referred to as a holder and a verifier, desire to engage in an exchange of digital information. Before the holder will share information with the verifier, the holder will determine whether the verifier is a trusted entity. Before the verifier trusts information that it receives from the holder, it will examine a proof that it received from the holder to determine whether the proof includes information from or about a trusted third party referred to as an issuer. Information from an identity authority may be used in each of these verification steps.

19 Claims, 10 Drawing Sheets

(56) References Cited

U.S. PATENT DOCUMENTS

2020/0177377 A1 6/2020 Smith et al.
2020/0274713 A1 8/2020 Li et al.
2021/0288974 A1 9/2021 Murdoch et al.

* cited by examiner

METHOD AND SYSTEM FOR DIGITAL IDENTITY AND TRANSACTION VERIFICATION

RELATED APPLICATIONS AND CLAIM OF PRIORITY

This patent document claims priority to U.S. provisional patent application No. 63/266,560, filed Jan. 7, 2022. The disclosure of the priority application is fully incorporated into this document by reference.

BACKGROUND

Systems that verify the identity of a participant in a transaction, data provided a participant, or both are critical for modern electronic transactions. For example, when an individual makes an application to a government agency or transacts with a business, it is critical for the agency or business to be able to verify the identity of the individual. This ensures both security of the entity's systems and integrity of the entity's data. In addition, when the individual receives a request for information from the agency or business, it is important that the individual be able to verify the identity of the requesting party to ensure that the request is not a phish, scan or spoof that in which a bad actor is attempting to get compromising information from the individual. Also critical to digital transactions is the ability for an individual or organization to know whether to trust data received from another entity.

Current systems for identity and data verification can be cumbersome and time-consuming. Individuals may be required to fill out long forms with personal data, sometimes repeatedly, which can be a tedious process that potentially exposes the entity to fraud and the individual to identity theft. The existing processes are also error-prone and can result in the collection of inconsistent or inaccurate data, which can lead to processing delays, inappropriate denials of service, or both. In addition, entities such as agencies and businesses may need to spend significant time and resources to verify individual digital identities, and acquire, verify, store and manage large volumes of data.

This document describes methods and systems that are directed to the problems described above, and/or other issues.

SUMMARY

In various embodiments, users of mobile electronic devices that run a verification application will communicate with other electronic devices that are part of a blockchain infrastructure. Each mobile device includes or accesses a secure data storage medium housing verification information for entities that may participate in transactions with other entities such as government agencies or businesses. When a user of such a device initiates a transaction, verified information is transferred between organizations or individuals. The transaction itself may or may not be saved to the blockchain. An entity using another device with the verification app may then wish to authoritatively prove they are interacting with a trusted organization.

In some embodiments, a method of verifying whether to share information with an entity comprises, by an electronic device of a holder (i) receiving a data request from an electronic device of a verifier; (ii) determining whether the verifier is a trusted entity by: (a) if the data request includes an identity authority (IA) token, using the IA token to determine whether the verifier is a trusted entity, and (b) if the data request does not include the IA token, using a decentralized identifier (DID) for the verifier that was included in the data request to determine whether the verifier is a trusted entity; and (iii) upon determining that the verifier is a trusted entity, providing data to the verifier in response to the data request, otherwise rejecting the data request.

In some embodiments, a method of verifying whether to trust information received from an entity comprises, by an electronic device of a verifier: (i) sending a data request to an electronic device of a holder; (ii) in response to the data request, receiving data and a proof from the holder, wherein the proof comprises a DID
and a signature of an issuer; (iii) determining whether the data is associated with a trusted issuer by: (a) examining the proof to determine whether the proof also includes an identity authority (IA) token, (b) if the proof includes an IA token that was issued by a known IA, using the IA token to determine whether the issuer is a trusted entity, and (c) if the proof does not include the IA token, using the DID for the issuer that is in the proof to determine whether the issuer is a trusted entity; and (iv) upon determining that the issuer is a trusted entity, accepting the proof and using the data, otherwise rejecting the proof and the data.

In some embodiments, before the verifier sends the data request to the electronic device of the holder, the issuer may present the DID for the issuer to the known IA in a request for the IA token from the known IA, receive the IA token from the known IA in response to the request for the IA token, and write the DID for the issuer to a distributed ledger.

Some embodiments may combine any or all of the methods described above.

The methods described above may be embodied in a system including a processor and memory containing programming instructions that, when executed, will cause the processor to implement the actions described above. Various embodiments also include a computer program product that contains such programming instructions, and a memory containing the computer program product.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

This document describes a decentralized method and system for authoritatively verifying the digital identity of one or more participants in an online transaction, and also for verifying data provided in the transaction. Furthermore, a method is provided wherein the identities of the verifier(s) and issuer(s) may be verified via a trusted entity. Digital verification systems that use distributed ledgers (i.e., blockchain infrastructure) are currently known. However, when using a public ledger, the information that is placed on the ledger in current methods and systems is by definition accessible to the public. This creates a problem when an entity needs to verify an individual's personal information such as name, address, date of birth, government-issued credential (such as Social Security Number or driver's license number), vaccination records, employment records and the like, as the individual will not want this information to be public and instead want to control who has access to this information.

The decentralized verification solution described in this document verifies a user's personal information once and allows each user to store that information in a secure data storage medium on their electronic devices or on a cloud-based server. Users can share data when needed, but the users' identities and data can be independently verifiable using information that is stored on the blockchain.

In the processes below, each participant in the process will be associated with a unique decentralized identifier (DID). DIDs, as are known in the art, are a type of uniform resource identifier (URI) that uniquely refer to an entity as determined by that entity, rather than be a centralized registry, identity provider, or certificate authority. A DID may include a DID document, which is a set of data describing the entity that is the DID subject, along with a mechanism such as a cryptographic public key that the entity or its delegate can use to authenticate itself and prove its association with the DID.

Figure 1:
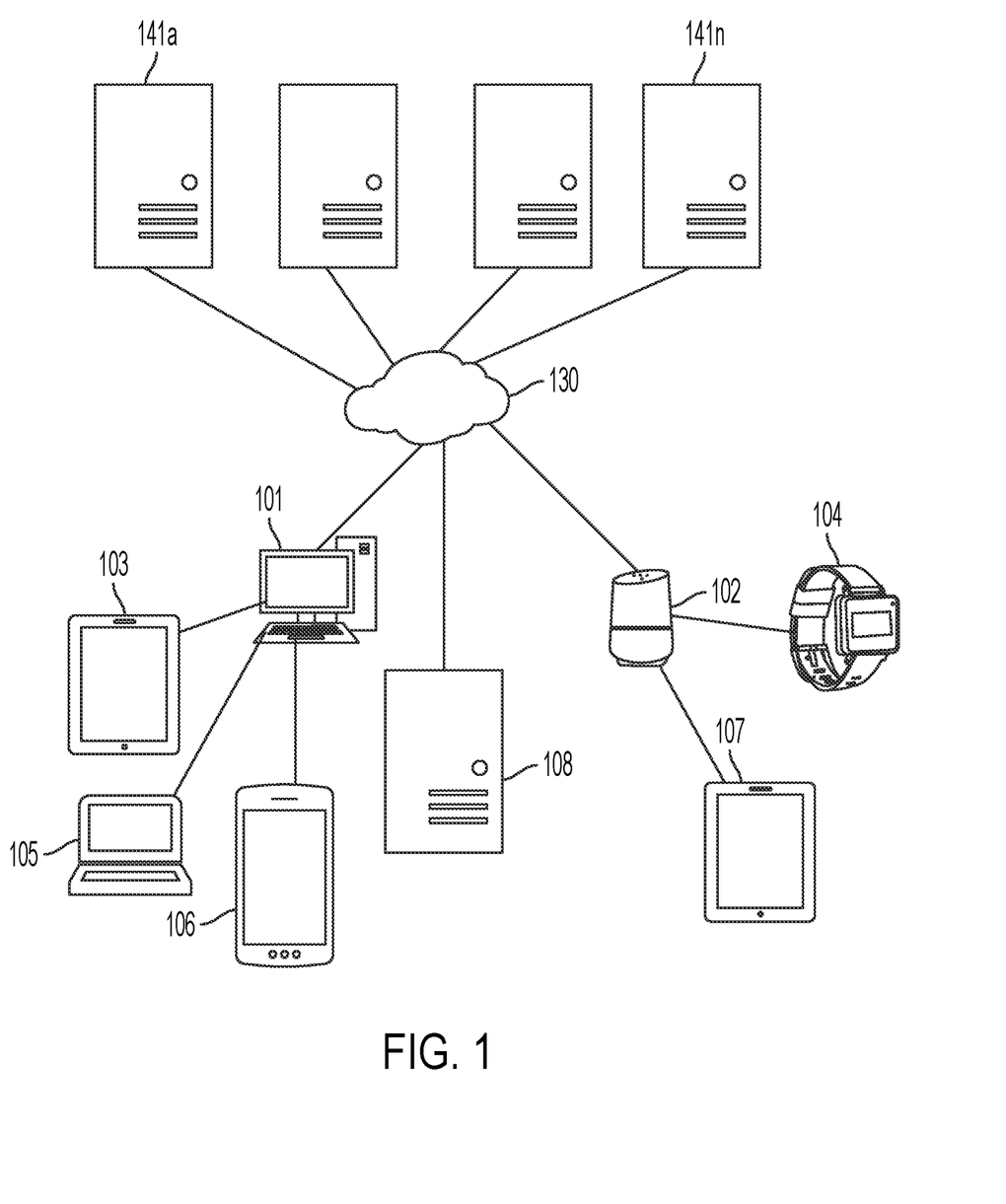
FIG. 1 illustrates an example system infrastructure in accordance with various embodiments.

FIG. 1 illustrates an example system in which multiple electronic devices 101-108 communicate with each other and/or one or more external electronic devices. The communication may be via a near-field communication protocol such as Bluetooth or Bluetooth Low Energy, via a short-range communication protocol, via one or more communication network 130 such as via wi-fi or another local area network, a wide area network, a mobile communication network, or by other communication protocols.

The electronic devices 101-108 may be in communication with any number of blockchain infrastructure electronic devices 141a . . . 141n via one or more communication networks 130. The blockchain infrastructure electronic devices 141a . . . 141n may each have data stores that, along with other electronic devices, collectively hold data elements of a distributed ledger (i.e., a blockchain).

Any or all of the electronic devices 101-108 may be configured with programming to run a digital verification application. Each device that runs the verification application may operate as an electronic device of a holder, an issuer, a verifier, or an identity authority, as each will be described in more detail below. Example applications, and processes that such applications (along with server applications) may implement, include without limitation issuing and verification of state driver's license information, government benefits applications, and other government-issued licenses.

Figure 2:
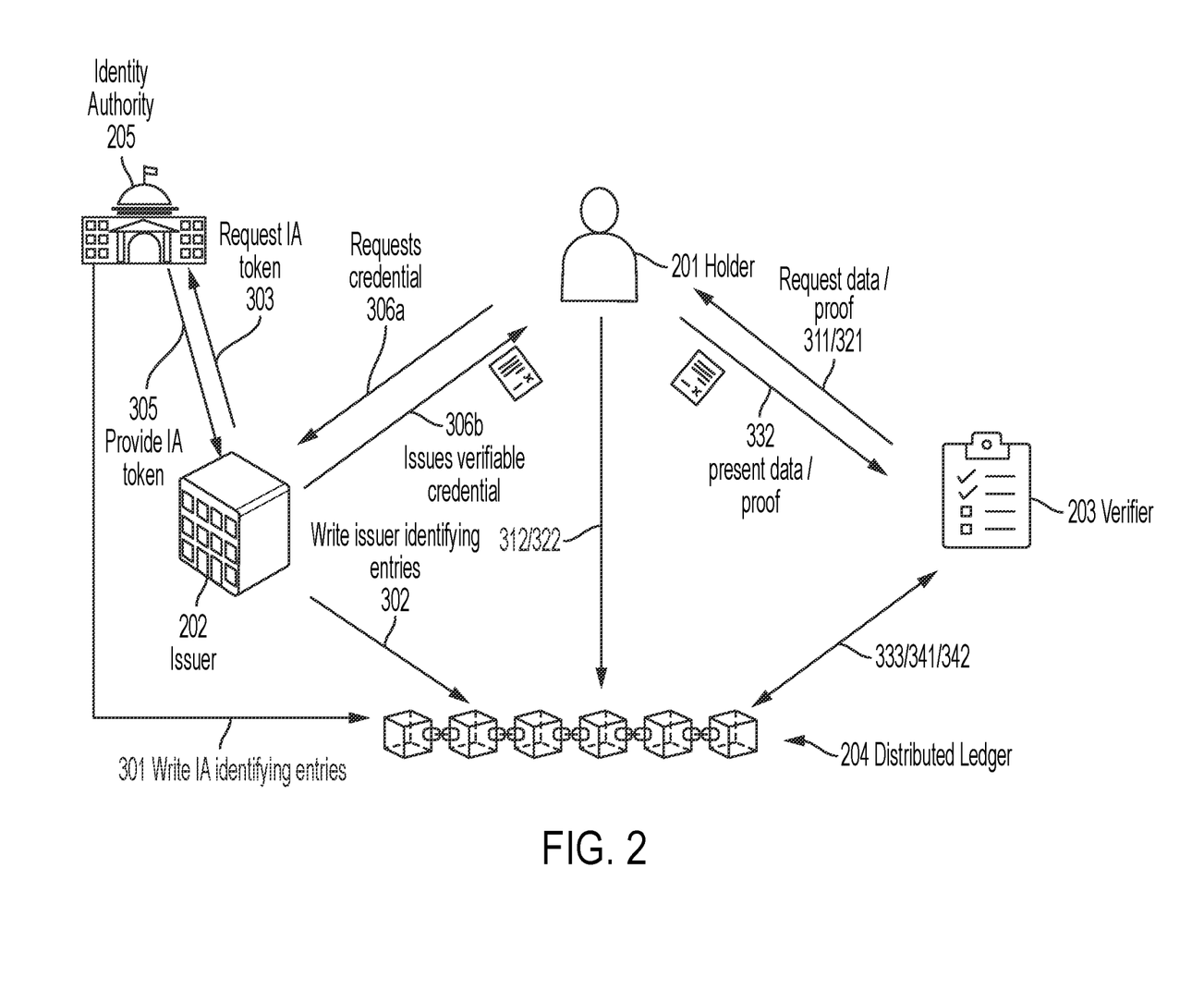
FIG. 2 illustrates an example process flow for identity and data verification in graphic format.
Figure 3A:
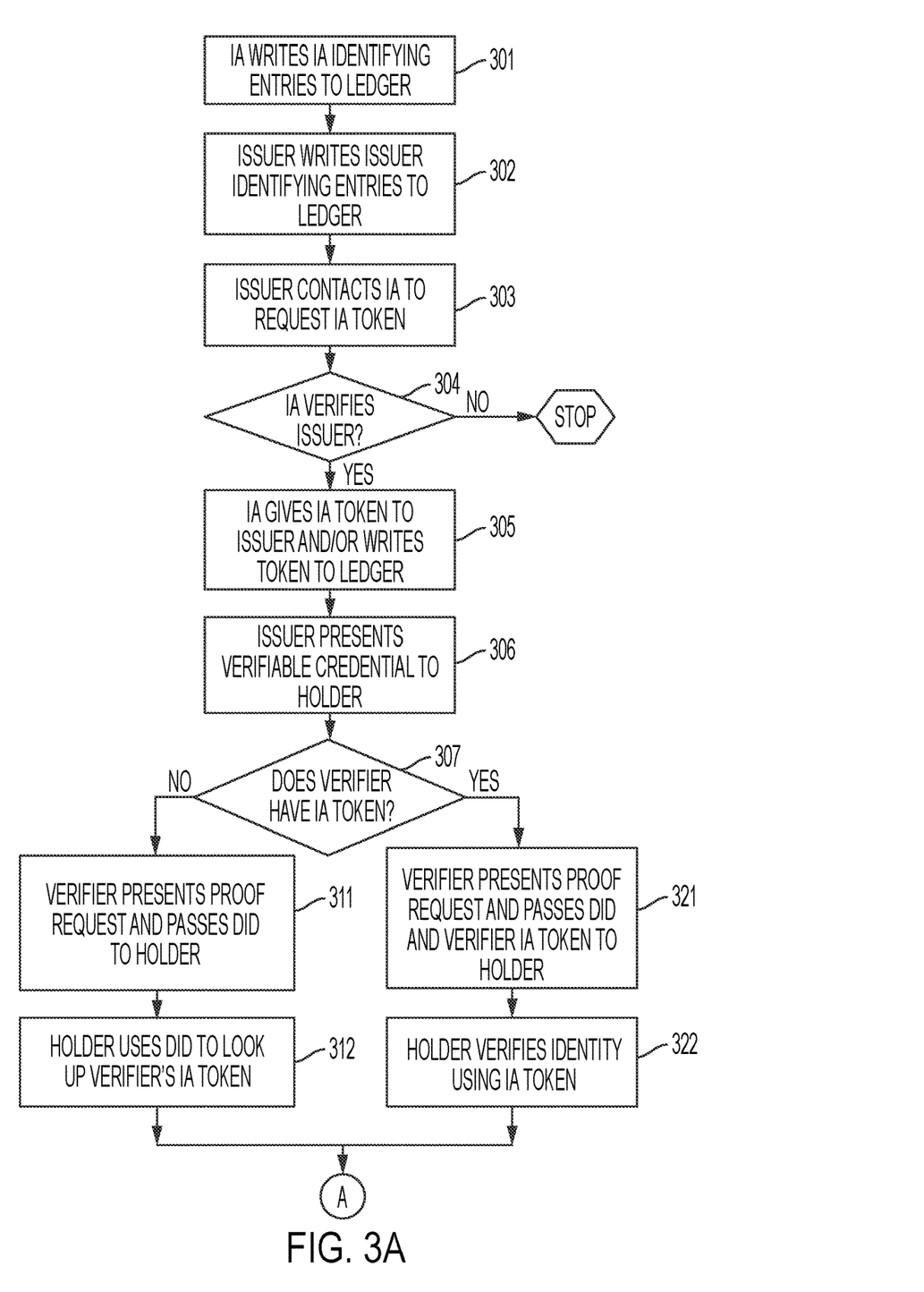
FIGS. 3A and 3B illustrate the process flow of FIG. 2 in a flowchart format.
Figure 3B:
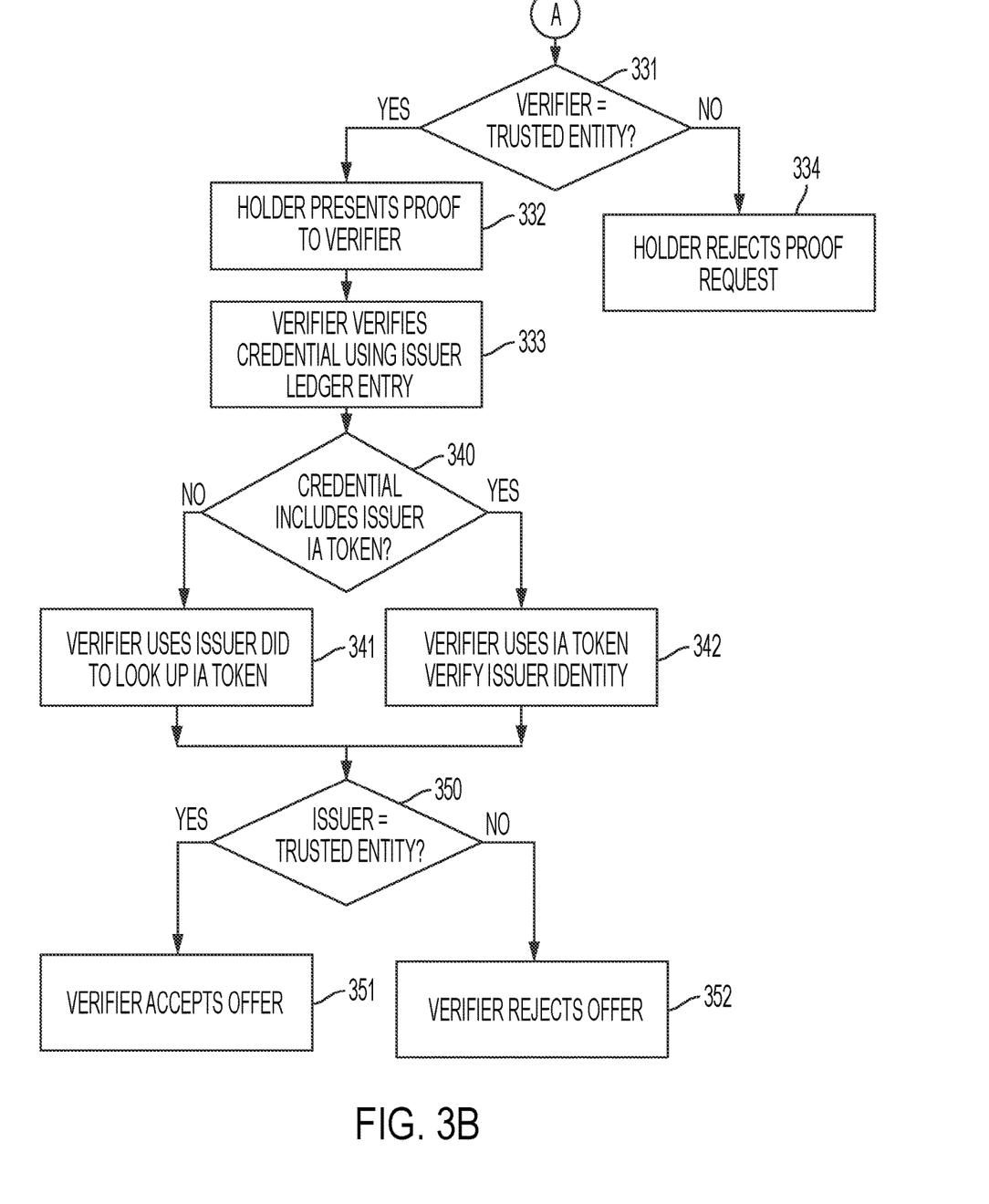

FIGS. 2, 3A and 3B illustrate an example process flow by which an electronic device of an entity referred to as a "verifier" 203 may verify the identity of, and choose whether or not to trust information provided by, a "holder" 201, and by which the holder 201 may confirm the identity of the verifier 203 and choose whether or not to share data with the verifier 203. In addition to verifying the content of the information and that the holder 201 has not altered the data since receiving it, the verifier 203 may need to verify that the issuer 202 (which typically, but not necessarily, may be a governmental agency, business, or other organization) is legitimate. This document uses the terms "verifier," "issuer" and "holder" to reflect the fact that the holder is a user (such as an individual) of a secure data storage application that holds personal information associated with the issuer 202, while the issuer 202 is an entity that delivers a verifiable credential to the holder 201. After the holder 201 receives the issuer's credential, the verifier 203 may use the credential to verify that data received from the holder 201 is trusted data.

The verifier 203 can verify the identity of the issuer 202 with the assistance of a verifying entity (referred to as an "identity authority" 205), which may be itself be an issuer, or it may be a system that is external to all the other participants shown in FIG. 2. The verifier 203 performs certain of the verification functions that are described in this document using information stored on an application in a distributed digital ledger 204.

Figure 4:
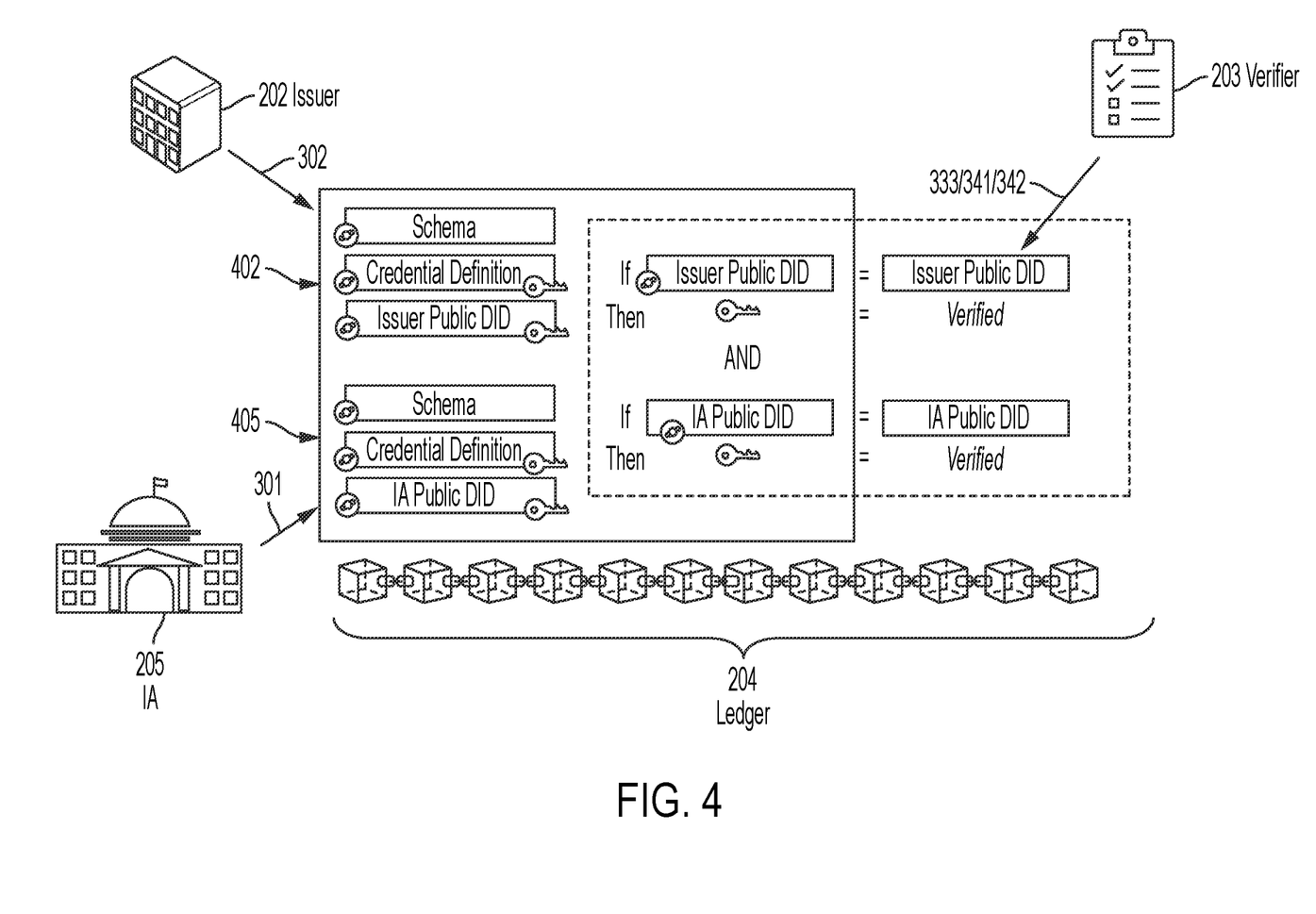
FIG. 4 provides additional detail about certain steps of the process of FIGS. 2 and 3A-3B.

With reference to FIGS. 2-6, before the verification described above begins, at step 301 an identity authority 205 will write one or more verifiable identifying entries for the identity authority to the distributed ledger 204. The identity authority 205 is a publicly known entity that publishes their public DID online. As used in this document an "identifying entry" is a one-time, initial entry that an entity writes to a digital ledger to identify itself. As shown in FIG. 4, the identifying entries 405 for the identity authority will include a DID for the identity authority, along with a schema and a credential definition for the identity authority's DID. The identity authority credential also will include a verification key, which is a public key that can be used to verify the authenticity of one or more identify authority tokens ("IA tokens"), which have a use that will be described below.

At step 302 the issuer 202 also will write one or more of its identifying entries to the distributed ledger 204. As shown in FIG. 4, the issuer's identifying entries 402 will include a DID for the issuer, along with a schema and a credential definition for the issuer's DID.

At step 303 the issuer will contact the identity authority to request an IA token. In connection with this request, the issuer will present the issuer's DID, optionally with other attributes such as, for example, a web uniform reference locator (URL), a legal name, and/or other identifying information to the identity authority.

Figure 5:
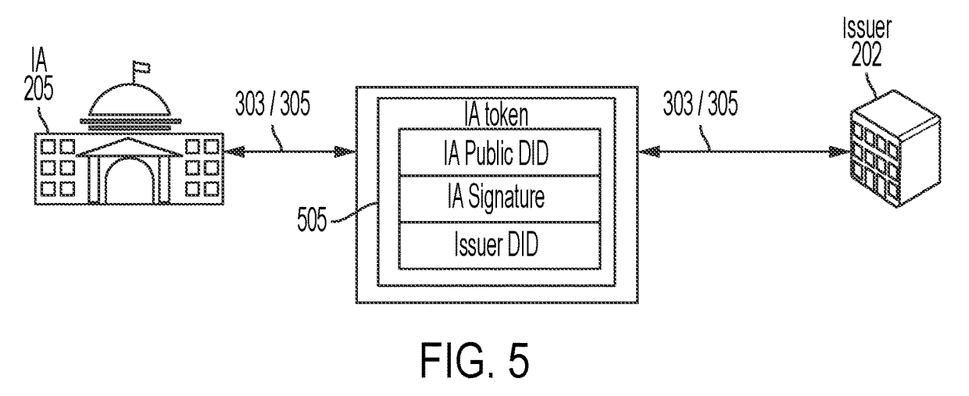
FIG. 5 provides additional detail about certain other steps of the process of FIGS. 2 and 3A-3B.

At 304 the identity authority will attempt to verify the issuer. The identity authority may do this by, for example, requiring the issuer to prove that it owns the private key associated with the DID and/or to prove that it has control of or a legal right to use the identifying information provided. This may happen in several possible ways, such as by examining the issuer's DID and determining whether it matches the public issuer DID that the issuer wrote to the distributed ledger, or by providing the information to a human analyzer to review and return a response. If the identity authority does not verify the issuer at 304, then the process ends. However, if verification of the issuer occurs at step 304, at step 305 the identity authority 205 will then give an IA token to the issuer 202, write the IA token to the ledger 204, or both. As shown in FIG. 5, in which the identity authority shares the IA token 505 with the issuer 202, the IA token 505 will include the public DID for the identity authority and the issuer's DID, and it will be signed using a signature created with the identity authority's private key. The IA token 505 also may include other data describing or relating to the identity authority, issuer, or other entities or processes. The issuer may then use the IA token or information from it in an issuer credential, which (as described below) a verifier can use to verify authenticity of an issuer or holder later in the process.

At step 306 the issuer will present a verifiable credential to the holder. FIG. 2 indicates that the presentation of a verifiable credential may include presentation (step 306*b*) of the credential in response to receipt of a request for the verifiable credential from the holder (step 306*a*). This may happen, for example, by the holder logging into a website or other service that the issuer provides or is affiliated with, and filling out a form or otherwise providing certain data (such as a social security number, driver's license number, or other personal information, or by scanning a QR code or other barcode) in order to prove that the holder is entitled to receive the data. Alternatively, the issuer may present the verifiable credential to the holder on its own initiative, such as in response to an update to the credential or an offline request to provide the credential to the holder.

Figure 6:
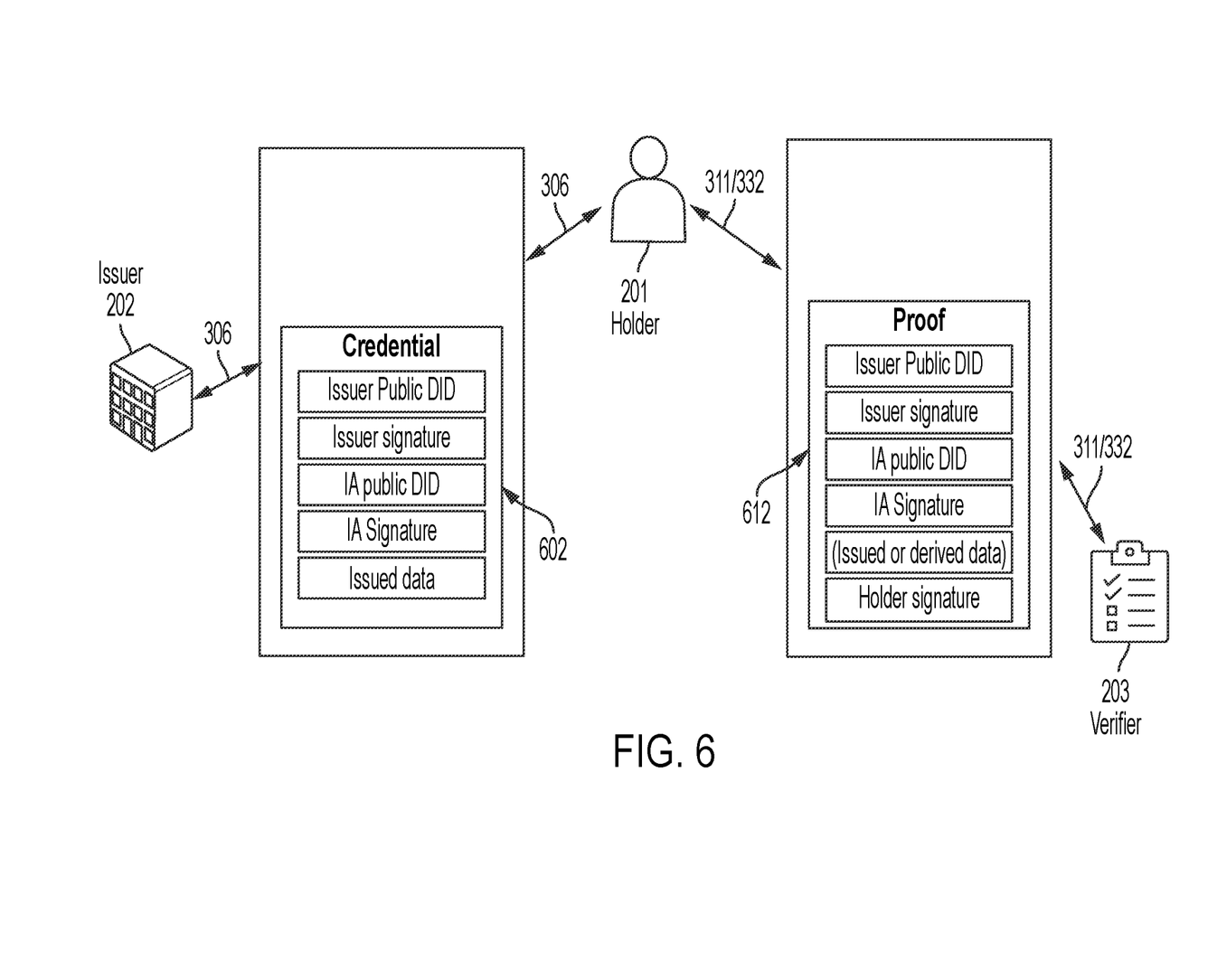
FIG. 6 provides additional detail about certain other steps of the process of FIGS. 2 and 3A-3B.

As shown in FIG. 6, the verifiable credential 602 of the issuer will include the issuer DID and a signature created with the issuer's private key. If the identity authority provided the issuer with an IA token, the verifiable credential 602 also will include that IA token (which includes at least the issuing authority's public DID, the issuer's public DID, and a signature created by the issuing authority). The verifiable credential 602 also may include, or may be provided along with, data that will be required to respond to a data request from a verifier. As will be described below, a verifier can (i) use the combination of the issuer's DID and public key to verify that the credential did in fact come from that issuer and was issued to the holder, and (ii) use the IA token (whether acquired directly from the holder or subsequently using some other query) verify that an issuer with which the verifier may not have a previous trust relationship can be permitted to provide verified data At some point, in response to a need to initiate a transaction between the holder and a verifier 203, the verifier 203 requests data from the holder 201. For example, as noted above if the holder requests a service from the verifier, the verifier may require the holder to provide social security information, driver's license information, or other data that the holder received from the issuer, or that the holder derived from such issued data. To do that, the verifier will send a request for the data to the holder, along with (or as part of) a proof request. However, before doing that, at 307 the verifier examines its internal data store to decide whether it has its own IA token to present to the holder. If it does (307: YES), then the process proceeds to step 321 described below. Otherwise (307: NO), the process proceeds to step 311 described below.

If the verifier 203 does not have its own IA token (307: NO), then at 311 the verifier 203 sends the proof request to the holder 201 and passes its own public DID to the holder 201 with the request. At 312, upon receiving the request from the verifier at 311, the holder 201, upon identifying that the request does not include an IA token, uses the verifier's DID to look up the verifier's IA token, either on the ledger or by direct request to an IA that the holder trusts. The holder then uses information from the IA token to determine whether to trust the verifier. Alternatively, the holder may send the verifier's DID to a trusted IA with a request to respond with information that the holder may use to determine whether to trust the verifier. Such information may include, for example, a human-readable name or a website URL.

If the verifier 203 has its own IA token (307: YES), then at 321 the verifier 203 sends the request to the holder 201 along with the verifier's IA token (which contains the verifier's public DID). At step 322, upon receiving the request from step 321 and noting that the request includes an IA token, the holder 201 uses the verifier's IA token to verify the identity of the verifier. The holder 201 may do this by, for example, by referencing information about the IA that is already in a local data store, or by lookup on the ledger to get the IA's information. If the IA token is from an identity authority that is known to the holder and the holder has a public key for the identity authority, then the holder may examine information in the IA token to determine whether the IA token has information indicating that the verifier may be trusted. If the IA token is from an identity authority that is known to the holder, but the holder does not have a public key for the identity authority, then the holder may look up the IA token on a distributed ledger or other service and examine information in the IA token accessed on the distributed ledger or other service. If the IA token is from an identity authority that is not known to the holder, then the holder may query an identity authority that is known to the holder as to whether the known identity authority has information indicating that the identity authority referenced by the verifier may be trusted.

Based on the result of the verification step (312 or 322), at 331 the holder 201 will determine whether or not verifier 203 is a trusted entity and thus legitimately allowed to request the data. This step may be automated using internal data and programming logic, or the results may be presented to a human operator for manual decision and result determination based on the data that is presented.

If the verifier is determined to not be a trusted entity (331: NO), then the holder rejects the request at 334 and no data is shared. If the verifier 203 is determined to be a trusted entity (331: YES), then the holder accepts the request (either in full or for a subset of the data), and at 332 the holder 201 presents the requested data (or a subset of it) to the verifier 203. As noted above, the requested data may be the issued data that the holder received from the issuer, or the requested data may be derived from the issued data.

At 332 the holder 201 will pass a proof to the verifier 203. As illustrated in FIG. 6, the proof 612 will include one or more elements from one or more verifiable credentials 602, where each element of the proof may be a copy of or derived through some computational process from, a corresponding element of the verifiable credential. The proof 612 will also contain evidence that each element is valid—i.e., was issued by the issuer to the holder and not tampered. The proof 612 also may include a signature provided by the holder 201 to prove that the holder is the one to whom the issuer provided the verifiable credential 602. As illustrated in FIG. 2, the holder 201 may present the proof in response to a request from verifier 203. For example, if the verifier 203 is part of or affiliated with an entity that provides a service, the verifier 203 may want to know that the issuer 202 authorized the holder 201 to access the service. Alternatively, the holder 201 may automatically pass the proof to the verifier with the data that the verifier requested.

At 333, upon receiving the data from the holder, the verifier 203 verifies that the issuer information in the proof was actually from the issuer claimed in the proof (or derived from information that the issuer issued) and not modified or tampered. At 340 the verifier 203 examines the credential for an IA token to assess whether the issuer can be trusted. If the credential contains one or more IA tokens (340: YES), then at 342 the verifier can use each IA token to get identifying information about the issuer referenced in the token, either directly from the identity authority 205 or by verification on the ledger 204, even if the issuer 202 was not previously known to the verifier 203. If the IA token is from an identity authority that is known to the verifier and the verifier has a public key for the identity authority, then the verifier may examine information in the IA token to determine whether the IA token has information indicating that the issuer may be trusted. If the IA token is from an identity authority that is known to the verifier but the verifier does not have a public key for the identity authority, then the verifier may look up the IA token on a distributed ledger and examine information in the IA token accessed on the distributed ledger. If the IA token is from an identity authority that is not known to the verifier, then the verifier may query an identity authority that is known to the verifier as to whether it has information indicating that the identity authority referenced by in the proof may be trusted.

If the proof references one or more issuers for which no IA token is included (340: NO), then at 341 the verifier can use the issuer's DID in the credential to acquire the token (or the equivalent), either by a lookup on the ledger and using information in the IA token to determine whether to trust the issuer, or by a direct request to a known identity authority 205 to return information (such as a human-readable name or URL) that the verifier may use to determine whether to trusts the issuer.

At 350, the verifier 203 uses the information from steps 340-342 to decide whether or not to trust the data received. If the verifier 203 is able to verify the issuer in either step 341 or 342, then the verifier may determine that the proof was authorized by an issuer that is a trusted entity (350: YES), and at 351 the verifier may accept the proof offered by the holder and use the holder's data for the requested purpose. For example, the verifier 203 may use the data to grant the holder access to a service, fill out a form for the holder, verify that the holder is (or is associated with) a person who is over a certain age, etc. If the verifier 203 does not verify the issuer in either step 341 or 342, then the verifier will not determine that the proof was authorized by an issuer that is a trusted entity (350: NO), and at 321 the verifier may reject the offer and not use the holder's data for the requested purpose unless the data is verified by some other means.

An example use case for the digital identity solutions described in this document, a government agency may be able use the system to validate and store HIRE (household, income, resources, expenses) data in an applicant's digital vault. The applicant (i.e., the holder) will only share the data with the agency (the verifier) after confirming that the agency is a trusted entity. The applicant can then confidently share required pieces of data with an agency when applying for a program, and the agency can trust this data based on verifiable proofs using the blockchain/distributed ledger. For any new information received, the agency can verify that data and add the verified data back to the applicant's digital vault by acting as an issuer to write a verifiable credential containing this data.

Figure 7:
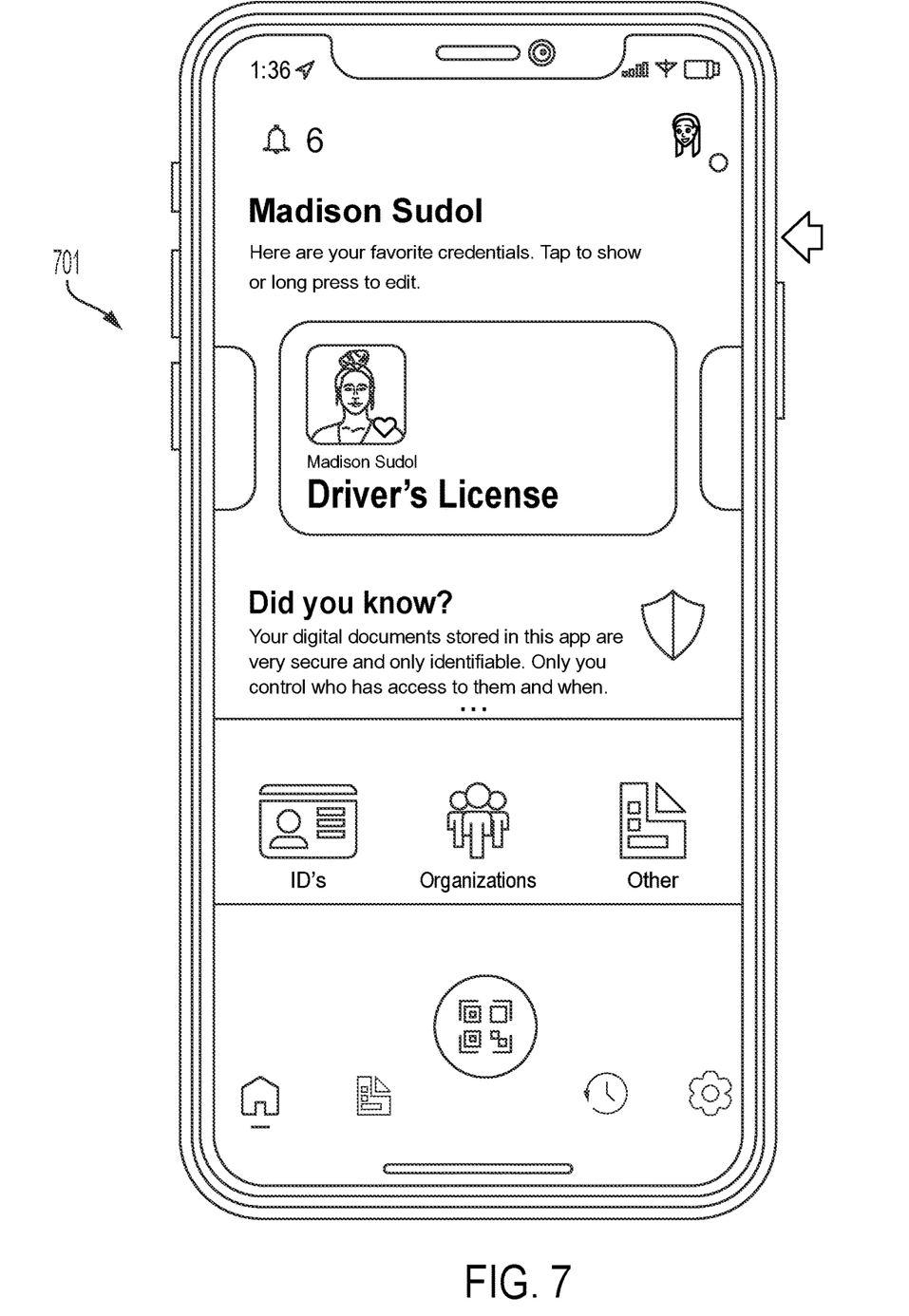
FIG. 7 illustrates an example user interface for an identity and data verification application for a user electronic device.

As another example, an individual applicant may apply to an agency that is administering a food or cash assistance program. The individual may use the identity verification and data storage application on their mobile electronic device to create a user profile. The verifier, another entity, and/or the electronic device may require the user to associate identity verification information with the application. Such identity verification information may include, for example, a username and passcode, or a biometric identifier (such as fingerprint, voice print, or facial recognition). The system also may verify that the user corresponds to a real, living person as stored in verifiable public records. The user may enter personally identifiable information such as that described in FIG. 7 above into the application, thus creating a secure digital vault for that information on the user's device, or on a server in a profile record that is only accessible to the application stored on the user's device. The user can then apply to various agencies for assistance, and upon notification that an agency website is that of a trusted entity, choose which information from the vault to share with that agency.

In this document, the terms "distributed ledger" and "digital ledger" each refer to an immutable data structure that is accessible by all participants in a transaction. An example is a blockchain, which includes a sequence of blocks that are linked together via nodes, and in which the blocks are replicated and distributed across multiple computing systems. In certain embodiments, a block may include a grouping of data or data records. Each block of a blockchain will include a link to an immediately preceding block in the blockchain, an immediately subsequent block in the blockchain, or both. Each block stores an identifier of its immediately preceding block, so that if the chain is broken or a block is inserted into the chain, the break or insertion will be detectable because of the mismatch of block data.

Figure 8:
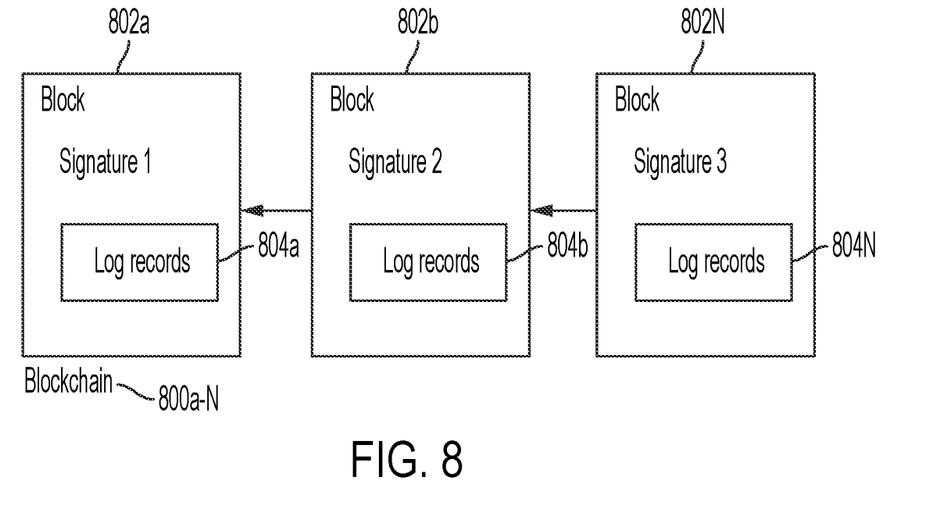
FIG. 8 illustrates an example blockchain data structure.

FIG. 8 illustrates an example blockchain data structure according to an embodiment. A blockchain 800a-N includes one or more blocks 802a-N. Optionally, a block may include one or more log records 804a-N. As new log records are generated, a corresponding data representation of those log records may be added to the blockchain 800a-N as part of a new block. As such, blocks 802a-N of a blockchain 800a-N may be positioned in a linear, sequential order. For example, blocks may be arranged in a chronological order. Blocks 802a-N in a blockchain 800a-N are linked to preceding blocks in the chain as illustrated in FIG. 8.

Optionally, one or more blocks 802a-N of a blockchain 800a-N may occupy the same data store or memory space. Alternatively, a blockchain 800a-N may be implemented as or via a distributed data store. For instance, blocks 802a-N of a blockchain 800a-N may not occupy the same data store or memory space, but rather two or more blocks in a blockchain may be implemented as distributed data stores.

These distributed data stores may exist amongst remote electronic devices. For instance, part of a blockchain 800a-N may be stored in a data store that is associated with a first electronic device in a first location, while a different part of the blockchain may be stored in a different data store that is associated with a second electronic device in a second location that is different from the first location.

A block 802a-N of a blockchain 800a-N may be located in a data store at a first location, while a second block of the blockchain may be located in a data store at a second location. Despite remote storage proximity to one another, the blocks 802a-N may still form the blockchain 800a-N as they are linked to one another such as, for example, by way of their signatures.

When a blockchain infrastructure device receives a record (referred to in this document as a transaction record), that device or another device of the blockchain platform will bundle the transaction record with one or more other records into a block. When grouping the transaction record into a block, the system may choose a group of records having a total size that is within a target size range. The platform may apply any other set of rules to determine which records to group into a block, such as rules that prioritize certain types of records over others, or rules that will group records having one or more common attributes.

The blockchain platform will verify the transaction and/or validate the block and, upon verification and verification, add the block to the platform's permanent distributed digital ledger. To validate a transaction (which is a process that the system may do before or after adding the transaction to a block), the system also may check the transaction against various rules. The rules can be kept on centralized servers, while in more distributed systems, all nodes that store any part of the blockchain would have a copy of all rules. For example, to validate a block, the system may create a proof of work for the block using any of various methods, such as by adding a nonce (a random number) to the block data, then hashing the block data. If the hash fails to meet the requirements of the proof of work, the nonce is changed and a new hash is made. When the system has successfully created a proof of work for a valid block, it sends the solution (the proof of work) to all nodes of the system.

Figure 9:
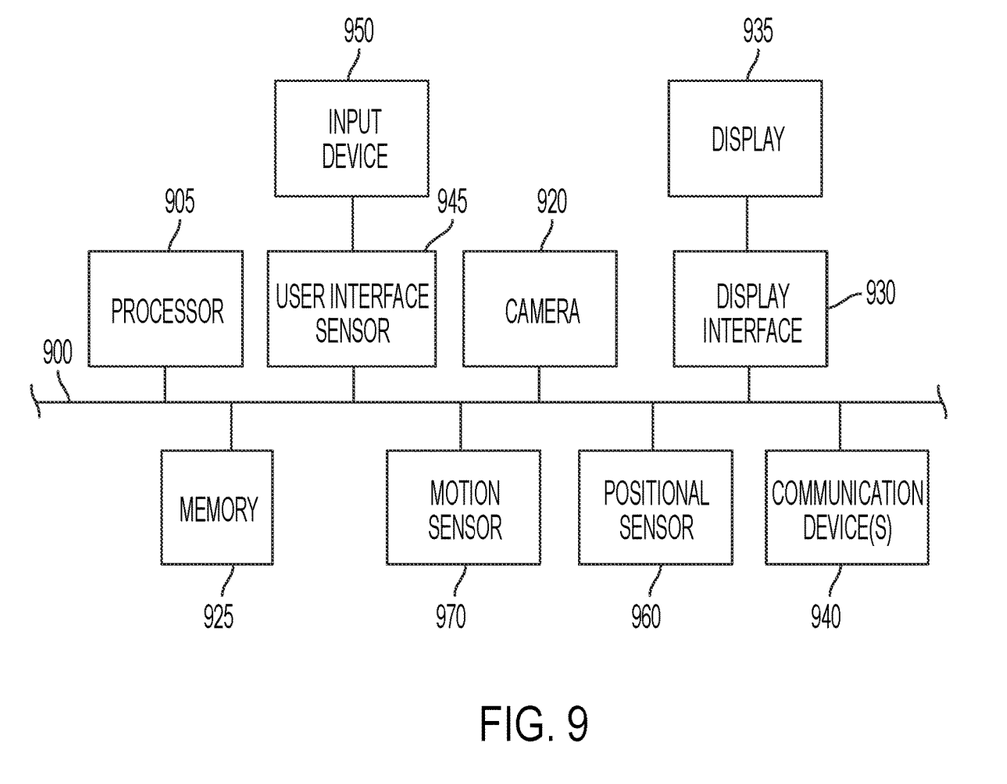
FIG. 9 is a block diagram that illustrates example components of an electronic device that may be used in connection with the system.

FIG. 9 depicts an example of internal hardware that may be included in any of the electronic components of the system, such as the user's smartphone or a local or remote computing device in the system. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored.

An optional display interface 930 may permit information from the bus 900 to be displayed on a display device 935 in visual, graphic or alphanumeric format. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication systems. The communication device 940 may be configured to be communicatively connected to a communications network, such as the Internet, a local area network or a cellular telephone data network.

The hardware may also include a user interface sensor 945 that allows for receipt of data from input devices 950 such as a keyboard, a mouse, a joystick, a touchscreen, a touch pad, a remote control, a pointing device and/or microphone. Digital image frames also may be received from a camera 920 that can capture video and/or still images. The system also may include a positional sensor 990 and/or motion sensor 980 to detect position and movement of the device. Examples of motion sensors 880 include gyroscopes or accelerometers. Examples of positional sensors 990 include a global positioning system (GPS) sensor device that receives positional data from an external GPS network.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include, with reference to FIG. 1, personal computers 101, servers 108 and 141a-n, mainframes, virtual machines, containers, gaming systems, televisions, digital home assistants 102 and mobile electronic devices such as smartphones 106, fitness tracking devices, wearable virtual reality devices, Internet-connected wearables such as smart watches 104 and smart eyewear, personal digital assistants, cameras, tablet computers 103, 107, laptop computers 105, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 9.

In this document, the terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the term "electrically connected", when referring to two electrical components, means that a conductive path exists between the two components. The term "communicatively connected", when referring to two devices, means that a communication path exists between the two components. In either case, the path may be a direct path, or an indirect path through one or more intermediary components.

Without excluding further possible embodiments, certain example embodiments are summarized in the following statements:

Statement 1: In some embodiments, a method of verifying whether to share information with an entity comprises, by an electronic device of a holder (i) receiving a data request from an electronic device of a verifier; (ii) determining whether the verifier is a trusted entity by: (a) if the data request includes an identity authority (IA) token, using the IA token to determine whether the verifier is a trusted entity, and (b) if the data request does not include the IA token, using a decentralized identifier (DID) for the verifier that was included in the data request to determine whether the verifier is a trusted entity; and (iii) upon determining that the verifier is a trusted entity, providing data to the verifier in response to the data request, otherwise rejecting the data request.

Statement 2: The method of statement 1 wherein, when the data request does not include the IA token, using the DID for the verifier to determine whether the verifier is a trusted entity comprises using the DID to either: (a) look up the IA token for the verifier on a distributed ledger and use information in the IA token to determine whether to trust the verifier; or (b) send the DID to a trusted IA to respond with information that the holder uses to determine whether to trust the verifier.

Statement 3: The method of statement 1 or 2 wherein, when the data request includes the IA token, using the IA token to determine whether the verifier is a trusted entity comprises: (a) if the IA token is from an IA that is known to the holder and the holder has a public key for the IA, examining information in the IA token to determine whether it has information indicating that the verifier may be trusted; (b) if the IA token is from an IA that is known to the holder, but the holder does not have a public key for the IA, looking up the IA token on a distributed ledger and examining information in the IA token accessed on the distributed ledger; or (c) if the IA token is from an IA that is not known to the holder, querying an IA that is known to the holder as to whether it has information enabling the verifier to determine whether or not the IA associated with the IA token in the proof may be trusted.

Statement 4: The method of any of statements 1-3 further comprising, by the holder electronic device, receiving, from an electronic device of an issuer: (a) a verifiable credential that comprises an issuer DID, an issuer signature, an IA DID, and an IA signature; and (b) issued data, wherein the issued data may or may not be included within the credential.

Statement 5: The method of statement 4 further comprising, by the holder electronic device, providing a proof to the verifier in response to the data request, wherein the proof comprises elements that are, or that are derived from, elements of the verifiable credential.

Statement 6: The method of statement 4 or 5, wherein the data provided to the verifier comprises the issued data and/or is derived from the issued data.

Statement 7: In some embodiments, a method of verifying whether to trust information received from an entity comprises, by an electronic device of a verifier: (i) sending a data request to an electronic device of a holder; (ii) in response, receiving data and a proof from the holder, wherein the proof comprises a decentralized identifier (DID) and a signature of an issuer; (iii) determining whether the data is associated with a trusted issuer by: (a) examining the proof to determine whether the proof also includes an identity authority (IA) token, (b) if the proof includes an IA token that was issued by a known IA, using the IA token to determine whether the issuer is a trusted entity, (c) if the proof does not include the IA token, using the DID for the issuer that is in the proof to determine whether the issuer is a trusted entity; and (d) if the IA token is from an IA that is not known to the holder, querying an IA that is known to the holder as to whether it has information enabling the verifier to determine whether or not the IA associated with the IA token in the proof may be trusted.

and (iv) upon determining that the issuer is a trusted entity, accepting the proof and using the data, otherwise rejecting the proof and the data.

Statement 8: The embodiment of statement 7 may be combined with any of statements 1-6.

Statement 9: The method of statement 7 or 8 wherein, when the credential does not include the IA token, using the DID for the issuer to determine whether the issuer is a trusted entity comprises using the DID to look up the IA token for the issuer on a distributed ledger and use information in the IA token to determine whether to trust the issuer, or to send the DID request to a trusted IA to respond with information that the holder uses to determine whether to trust the issuer.

Statement 10: The method of any of statements 7-9 wherein, when the credential includes the IA token, using the IA token to determine whether the issuer is a trusted entity comprises: (a) if the IA token is from an IA that is known to the verifier and the verifier has a public key for the IA, examining information in the IA token to determine whether the IA token has information indicating that the issuer may be trusted; (b) if the IA token is from an IA that is known to the verifier but the verifier does not have a public key for the IA, looking up the IA token on a distributed ledger and examining information in the IA token accessed on the distributed ledger; or (c) if the IA token is from an IA that is not known to the verifier, querying an IA that is known to the verifier as to whether it has information enabling the verifier to determine whether or not the IA associated with the IA token in the proof may be trusted.

Statement 11: The method of any of statements 7-10 wherein the data is included within the proof.

Statement 12: The method of any of statements 7-11 further comprising, by the issuer before the verifier sends the data request to the electronic device of the holder: (a) writing the DID for the issuer to a distributed ledger; (b) presenting the DID for the issuer to the known IA in a request for the IA token from the known IA; and (c) writing the DID for the issuer to a distributed ledger.

Statement 13: The method of statement 12 further comprising, by the issuer, presenting the holder with a credential that includes the DID for the issuer and the signature of the issuer.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of verifying whether to share information with an entity, the method comprising, by an electronic device of a holder:
   receiving a data request from an electronic device of a verifier;
   determining whether the verifier is a trusted entity by:
      if the data request includes an identity authority (IA) token, using the IA token to determine whether the verifier is a trusted entity, and
      if the data request does not include the IA token, using a decentralized identifier (DID) for the verifier that was included in the data request to determine whether the verifier is a trusted entity; and
   upon determining that the verifier is a trusted entity, providing data to the verifier in response to the data request, otherwise rejecting the data request.

2. The method of claim 1 wherein, when the data request does not include the IA token, using the DID for the verifier to determine whether the verifier is a trusted entity comprises using the DID to either:
   look up the IA token for the verifier on a distributed ledger and use information in the IA token to determine whether to trust the verifier; or
   send the DID to a trusted IA to respond with information that the holder uses to determine whether to trust the verifier.

3. The method of claim 1 wherein, when the data request includes the IA token, using the IA token to determine whether the verifier is a trusted entity comprises:
   if the IA token is from an IA that is known to the holder and the holder has a public key for the IA, examining information in the IA token to determine whether it has information indicating that the verifier may be trusted;
   if the IA token is from an IA that is known to the holder, but the holder does not have a public key for the IA, looking up the IA token on a distributed ledger and examining information in the IA token accessed on the distributed ledger; or
   if the IA token is from an IA that is not known to the holder, querying an IA that is known to the holder as to whether it has information enabling the verifier to determine whether or not the IA associated with the IA token in the proof may be trusted.

4. The method of claim 1 further comprising, by the electronic device of the holder:
   receiving, from an electronic device of an issuer:
      a verifiable credential that comprises an issuer DID, an issuer signature, an IA DID, and an IA signature; and
      issued data, wherein the issued data is or is not included within the credential.

5. The method of claim 4 further comprising, by the electronic device of the holder, providing a proof to the verifier in response to the data request, wherein the proof comprises elements that are, or that are derived from, elements of the verifiable credential.

6. The method of claim 4, wherein the data provided to the verifier comprises the issued data and/or is derived from the issued data.

7. The method of claim 1 further comprising, by the electronic device of the verifier:
   sending the data request to the electronic device of the holder;
   receiving the data and a proof from the holder, wherein the proof comprises a DID and a signature of an issuer;
   determining whether the data is associated with a trusted issuer by:
      examining the proof to determine whether the proof also includes the IA token,
      if the proof includes the IA token, using the IA token to determine whether the issuer is a trusted entity, and
      if the proof does not include the IA token, using the DID for the issuer that is in the proof to determine whether the issuer is a trusted entity; and
   upon determining that the issuer is a trusted entity, accepting the proof and using the data, otherwise rejecting the proof and the data.

8. The method of claim 1 further comprising:
   by the electronic device of the holder before receiving the data request, sending a service request to the verifier,
   wherein the data request is sent by the verifier in response to the service request.

9. A computer program product comprising a memory device and programming instructions that are configured to cause a processor of an electronic device of a holder to perform a method of verifying whether to share information with an entity, the method comprising:
   receiving a data request from an electronic device of a verifier;
   determining whether the verifier is a trusted entity by:
      if the data request includes an identity authority (IA) token, using the IA token to determine whether the verifier is a trusted entity, and
      if the data request does not include the IA token, using a decentralized identifier (DID) for the verifier that was included in the data request to determine whether the verifier is a trusted entity; and
   upon determining that the verifier is a trusted entity, providing data to the verifier in response to the data request, otherwise rejecting the data request.

10. The computer program product of claim 9, further comprising programming instructions that are configured to cause the electronic device of the verifier to perform a method comprising:
   sending the data request to the electronic device of the holder;
   receiving the data and a proof from the holder, wherein the proof comprises a DID and a signature of an issuer; and
   determining whether the data is associated with a trusted issuer by:

examining the proof to determine whether the proof also includes the IA token,
if the proof includes the IA token, using the IA token to determine whether the issuer is a trusted entity, and
if the proof does not include the IA token, using the DID for the issuer that is in the proof to determine whether the issuer is a trusted entity; and
upon determining that the issuer is a trusted entity, accepting the proof and using the data, otherwise rejecting the proof and the data.

11. A method of verifying whether to trust information received from an entity, the method comprising, by an electronic device of a verifier:
sending a data request to an electronic device of a holder;
in response to the data request, receiving data and a proof from the holder, wherein the proof comprises a decentralized identifier (DID) and a signature of an issuer;
determining whether the data is associated with a trusted issuer by:
examining the proof to determine whether the proof also includes an identity authority (IA) token,
if the proof includes an IA token that was issued by a known IA, using the IA token to determine whether the issuer is a trusted entity,
if the proof does not include the IA token, using the DID for the issuer that is in the proof to determine whether the issuer is a trusted entity, and
if the IA token is from an IA that is not known to the holder, querying an IA that is known to the holder as to whether it has information enabling the verifier to determine whether or not the IA associated with the IA token in the proof may be trusted; and
upon determining that the issuer is a trusted entity, accepting the proof and using the data, otherwise rejecting the proof and the data.

12. The method of claim 11 wherein, when the proof does not include the IA token, using the DID for the issuer to determine whether the issuer is a trusted entity comprises using the DID to either:
look up the IA token for the issuer on a distributed ledger and use information in the IA token to determine whether to trust the issuer; or
send the DID request to a trusted IA to respond with information that the verifier uses to determine whether to trust the issuer.

13. The method of claim 11 wherein, when the proof includes the IA token, using the IA token to determine whether the issuer is a trusted entity comprises:
if the IA token is from an IA that is known to the verifier and the verifier has a public key for the IA, examining information in the IA token to determine whether the IA token has information indicating that the issuer may be trusted;
if the IA token is from an IA that is known to the verifier but the verifier does not have a public key for the IA, looking up the IA token on a distributed ledger and examining information in the IA token accessed on the distributed ledger; or
if the IA token is from an IA that is not known to the verifier, querying an IA that is known to the verifier as to whether it has information enabling the verifier to determine whether or not the IA associated with the IA token in the proof may be trusted.

14. The method of claim 11, wherein the data is included within the proof.

15. The method of claim 11 further comprising, by the issuer before the verifier sends the data request to the electronic device of the holder:
writing the DID for the issuer to a distributed ledger;
presenting the DID for the issuer to the known IA in a request for the IA token from the known IA; and
receiving the IA token from the known IA in response to the request for the IA token.

16. The method of claim 15 further comprising, by the issuer, presenting the holder with a credential that includes the DID for the issuer and the signature of the issuer.

17. A computer program product comprising a memory device and programming instructions that are configured to cause a processor of an electronic device of a verifier to perform a method of determining whether to trust information received from with an entity, the method comprising:
sending a data request to an electronic device of a holder;
in response to the data request, receiving data and a proof from the holder, wherein the proof comprises a decentralized identifier (DID) and a signature of an issuer; and
determining whether the data is associated with a trusted issuer by:
examining the proof to determine whether the proof also includes an identity authority (IA) token,
if the proof includes an IA token that was issued by a known IA, using the IA token to determine whether the issuer is a trusted entity, and
if the proof does not include the IA token, using the DID for the issuer that is in the proof to determine whether the issuer is a trusted entity; and
upon determining that the issuer is a trusted entity, accepting the proof and using the data, otherwise rejecting the proof and the data.

18. The computer program product of claim 17, further comprising programming instructions that are configured to cause an electronic device of the holder to:
present the DID for the issuer to the known IA in a request for the IA token from the known IA;
receive the IA token from the known IA in response to the request for the IA token; and
write the DID for the issuer to a distributed ledger.

19. The computer program product of claim 18, further comprising programming instructions that are configured to cause an electronic device of a verifier to perform a method comprising:
sending a data request to an electronic device of the holder;
in response to the data request, receiving data and a proof from the holder, wherein the proof comprises a DID and a signature of an issuer; and
determining whether the data is associated with a trusted issuer by:
examining the proof to determine whether the proof also includes the IA token,
if the proof includes the IA token, using the IA token to determine whether the issuer is a trusted entity, and
if the proof does not include the IA token, using the DID for the issuer that is in the proof to determine whether the issuer is a trusted entity; and
upon determining that the issuer is a trusted entity, accepting the proof and using the data, otherwise rejecting the proof and the data.

\* \* \* \* \*